E. J. WIGGINS.
MIXTURE MODIFYING AUXILIARY FOR INTERNAL COMBUSTION ENGINES.
APPLICATION FILED DEC. 14, 1916.
1,233,942. Patented July 17, 1917.
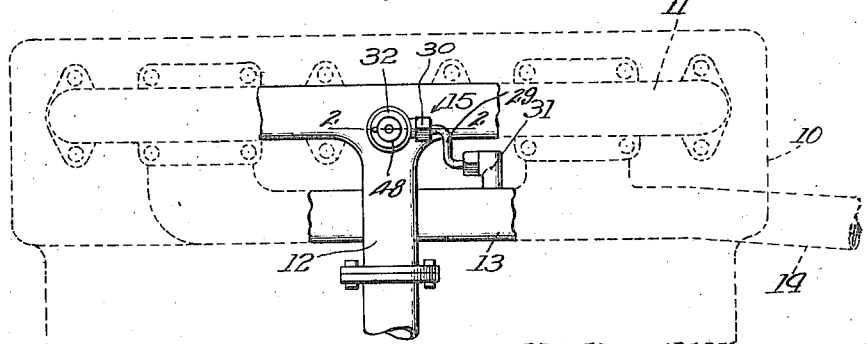
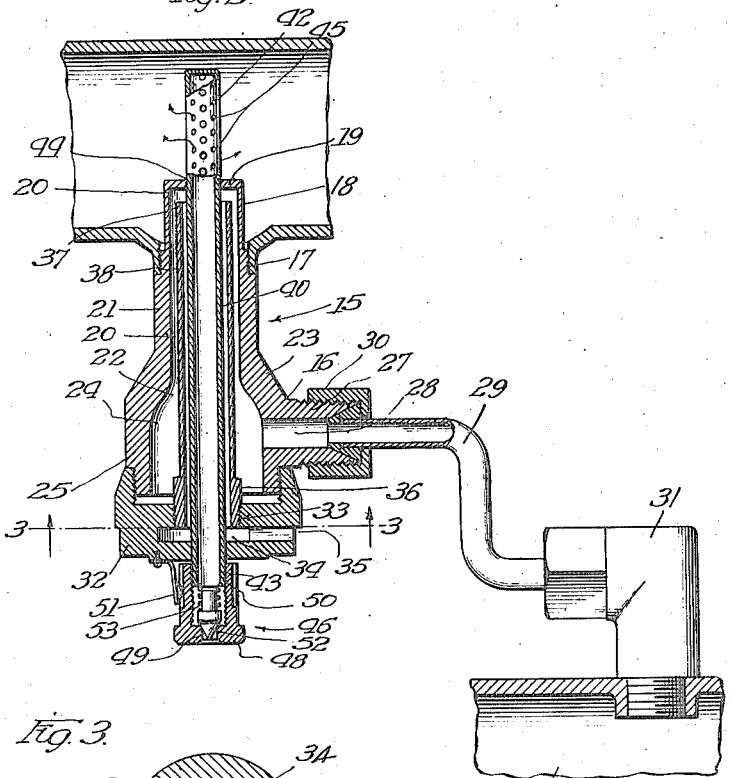
Witnesses:
Robert H. Weir
Arthur W. Carlson
Inventor
Edward J. Wiggins
Jones Bain & May
Attys.

UNITED STATES PATENT OFFICE.

EDWARD J. WIGGINS, OF CHICAGO, ILLINOIS, ASSIGNOR TO DAVID ALBERT HEYMAN, OF CHICAGO, ILLINOIS.

MIXTURE-MODIFYING AUXILIARY FOR INTERNAL-COMBUSTION ENGINES.

1,233,942.  Specification of Letters Patent.  Patented July 17, 1917.

Application filed December 14, 1916. Serial No. 136,939.

*To all whom it may concern:*

Be it known that I, EDWARD J. WIGGINS, a citizen of the United States, residing at Chicago, in the county of Cook and State of Illinois, have invented certain new and useful Improvements in Mixture-Modifying Auxiliaries for Internal-Combustion Engines, of which the following is a specification.

My invention relates to a mixture-modifying auxiliary for internal combustion engines and has for its general object to provide a simple, inexpensive and efficient means for introducing into the mixture passage that leads to the cylinder intake an auxiliary supply of heated air and for supplying heat to the fuel mixture, all under conditions tending to minimize the component of fuel or hydrocarbon requisite for proper operation of the engine and also to enable lower-grade gasolene to be efficiently used than would be satisfactory without such auxiliary.

In the drawing wherein I have shown a single embodiment of my invention for purposes of disclosure, but without intent to limit my invention, in its broader aspects, to the details thereof—

Figure 1 shows conventionally fragments of an engine equipped with a mixture modifier according to my invention;

Fig. 2 is a section through the device on line 2—2 of Fig. 1; and

Fig. 3 is a section on line 3—3 of Fig. 2.

Of the engine parts 10 represents a multiple cylinder head, 11 an intake manifold in T-communication with a mixture-pipe or conduit 12 that leads from a carbureter (not shown) and 13 represents an exhaust manifold connecting with exhaust conduit 14.

In the intake conduit, between carbureter and intake port, and preferably near the intake openings, I locate the shell of the mixture modifier 15—preferably at the T-juncture of the manifold 11 and pipe 12,—so that parts of the fuel modifier projecting into the mixture passage may be positioned to be impinged upon by the mixture, before its distribution to the several cylinders.

The mixture modifier affords an auxiliary air tube, that may be valved for inward air flow only, opening from external atmosphere to the mixture conduit, and heating means, receiving high-temperature gases from the exhaust conduit and arranged with respect to the air tube to heat the inflowing air to high degree, as well as to heat the mixture in the mixture passage materially.

Specifically, the shell-body 16, that is preferably a stout casting, screws into the intake manifold, as at 17, and the shell-nose 18, end-closed as at 19, extends into the mixture-passage. The nose is preferably thin-walled and its cylindrical bore 20 extends back through a thickened part 21 of the body and expands as at 22, within a flaring part 23 of the shell, into an enlarged reception-chamber 24 contained in a shell part 25 of largest diameter. A threaded lateral stud 27 has an inlet passage 28 to the reception chamber and receives an appropriate pipe 29, secured thereto by a gland-nut 30, said pipe leading from a suitable open connection 31 with exhaust pipe 13, so that in operation the shell may receive exhaust gases. A screw-threaded shell-head 32 closes the outward end of the reception chamber 24 and has therein a threaded orifice 33 opening to a circular chamber 34 that communicates with lateral outlet passage 35. Gases flowing from inlet 28 to outlet 35 are directed into the shell-nose by a baffle-cylinder 36 that is threaded into head-orifice 33 for support and extends, concentrically with the wall of shell-bore 20 and spaced therefrom, to an open end 37 near the end wall 19 of the shell-nose, the cylinder-bore 38 opening to bore 20 of the shell.

The air-tube 40 extends axially through baffle cylinder 36 and the shell-nose to project at opposite ends as a delivery terminal 42 within the mixture-passage and an inlet terminal 43 for communicating with the outside air.

Preferably the air tube is threaded as at 44 into the end wall 19 of the shell-nose and is slip-fitted in the wall of head 32, the delivery end 42 being apertured as at 45 in tiny jet-openings and its inlet end 43 preferably bearing an adjustable, inwardly opening check valve 46. A cap 48, having a valve-seated opening 49, adjustably threaded as at 50 on the tube-end, and held in adjusted position by a spring finger 51, incases a conical valve 52 acted on by spring 53 that bears against the tube end, as a satisfactory structure for the stated purpose.

In operation the exhaust gases flow from the exhaust conduit via connection 29, enter the enlarged reception chamber 24, and thence they pass through the outermost channel 20 along the baffle cylinder and turn back through the passage 38 around the air tube 40 to pass through the muffler chamber 34 and outlet 35 for final escape. As the exhaust gas enters the reception chamber its velocity is reduced and its residence in such chamber facilitates the deposit of such carbon particles as are being carried along in this easily accessible and readily cleaned chamber. Entering the annular longitudinal passages of reduced section the gas travels at higher velocity and tends to give up its heat particularly at the back turn in the nose of the shell, and throughout the restricted annular passages the gas velocity tends to keep the walls swept clean of carbon. This arrangement, affording a tortuous path with areas of different cross section, decreasing in successive steps, also tends to minimization of the exhaust noise and the final muffler chamber 34 wherein the gas may slow down, enables it to find egress without producing objectionable sound.

It will be apparent that the projection of the heating nose 20 in the air pipe end into the mixture conduit of an engine—if the conduit be scientifically proportioned at all points for equal and necessary capacity—must diminish somewhat the conduit area and so tend to throttle the engine, but the heating effect of the nose so expands and volatilizes the passing mixture as to compensate materially for the throttling. The direct contact of the mixture with the projecting nose extending well into the mixture conduit insures a highly desirable application of the heating effect, furthered, to a degree, by the tendency of the flowing mixture to eddy in proximity to the projecting portion of the heater. The projecting nose, readily maintained at a temperature in excess of the distillation point of the gasolene, tends to crack even low grade gasolene, so as to insure its complete vaporization and thus to give to the mixture an effectiveness that, in the absence of such heating, would require a greater richness. The benefits of this direct heating are augmented by the introduction into the fuel mixture at this point of maximum heating of hot air that is drawn in past the valve 52 on each suction stroke of the engine and is raised to high temperature during its traverse of the air tube 40 and is jet distributed through the openings 45, into the mixture passage in a heated and expanded state. The mixture is thus made "leaner" coincidentally with its heating, so that the modification of fuel mixture for in- creased volatilization, heat expansion, and augmented oxygen content, all tends to prevent condensation of the hydrocarbon content and to present conditions favoring minimization of the hydrocarbon content of the mixture requisite for a desired activity of the engine.

The air valve 52 may be dispensed with under some conditions, but as a convenient means for adjustably regulating the quantity of air to be supplied, such valve mechanism has advantages of preferred refinement. The mechanical advantages of the construction in providing a self contained article for manufacture and sale readily applicable to many and varied types of engines, and giving requisite ease of attachment and facility for cleaning, do not require detail comment.

It will be apparent that many changes may be made in details of construction without departure from the spirit of my invention within the scope of the appended claims.

Having described my invention, what I claim is:—

1. A mixture-modifier, for a gas engine having a mixture conduit and an exhaust conduit, comprising a chambered shell having a threaded end screwed into a side opening of the mixture conduit to heat the mixture therein, said shell having an exhaust-gas-receptive connection with the exhaust conduit and an escape-opening; and an auxiliary air-tube traversing the heated chamber of the shell, opening at opposite ends to the atmosphere and through the end of the shell to the mixture-conduit.

2. A mixture-modifier, for a gas engine having a mixture conduit and an exhaust conduit, comprising a chambered shell having a threaded end screwed into a side opening of the mixture conduit to heat the mixture therein, said shell having an exhaust-gas-receptive connection with the exhaust conduit and an escape-opening; and an auxiliary air-tube traversing the heated chamber of the shell, said tube having one end arranged for communication with the outside air and a finely perforated spraying-end opening to the mixture conduit.

3. A mixture-modifier, for a gas engine having a mixture conduit and an exhaust conduit, comprising a shell attached to the mixture conduit and inclosing a heating chamber arranged to heat the mixture in the conduit, said shell having an exhaust-gas-receptive connection with the exhaust conduit and an escape opening; an auxiliary tube traversing said shell-chamber opening at opposite ends beyond the shell and to the mixture conduit respectively and a baffle cylinder dividing the shell-space around said tube into communicating concentric longitudinal passages.

4. A mixture-modifier, for a gas engine having a mixture conduit and an exhaust conduit, comprising a shell having a chambered portion projecting into the mixture conduit, said chambered portion having a receptive connection with the exhaust conduit and an outlet opening, and an auxiliary air tube associated with the shell and opening to the air and to the mixture conduit.

5. A mixture-modifier, for a gas engine having a mixture-conduit and an exhaust conduit, comprising a shell having a chambered portion projecting into the mixture-conduit said chambered portion having a receptive connection with the exhaust conduit and an outlet opening, an air-tube traversing a heated portion of said shell and opening to the air and to the mixture conduit, and means within the shell for directing into the projecting chambered portion the exhaust gases in passing from the receptive connection to the outlet.

6. A device of the character described comprising a shell having a hollow body, and a detachable head, there being an exhaust-gas receptive inlet opening to one said part and an outlet opening from the other, means for attaching said body to the mixture conduit, an air tube traversing the body and head and opening beyond opposite ends thereof, and a baffle cylinder interposed between the inlet and outlet openings of the body, encircling the air tube and spaced therefrom, and dividing the body space into longitudinal annular passages communicating with each other around an end of said baffle cylinder.

7. In a device of the character described the combination of a shell having a body chambered lengthwise and a detachable head, there being an exhaust receptive inlet opening in one said part and an outlet opening in the other, said body provided with means for attaching it to a mixture conduit, an air tube carried by the body and slip fitted with the head and opening at its ends beyond both the body and the head, and a detachable baffle cylinder encircling the air tube extending from the head nearly to the opposite end of the body, dividing the body space around the air tube into a plurality of annular passages communicating with each other beyond the end of said baffle cylinder and respectively communicating with the said inlet and outlet.

8. A mixture modifier for gas engines comprising a shell-body having an enlarged reception chamber communicating with an inlet for exhaust gases and having an elongated cylindrical bore, an air tube extending through said body and opening beyond both ends thereof, a baffle cylinder open at its inner end surrounding the air tube and spaced from both the air tube and the shell bore and a shell-head having an outlet opening communicating with the interior of the baffle cylinder.

9. A mixture modifier for gas engines comprising a shell, means for attachment thereof to an intake conduit, an air tube carried thereby and opening to said conduit, means dividing the shell space around the air tube into a tortuous passage having portions of different diameters, there being an outlet opening, and an inlet opening connectible with an exhaust conduit, at opposite ends of said tortuous passage.

10. A mixture modifier for gas engines comprising a hollow shell having an end portion adapted to project into a mixture conduit, means for connecting said shell with a mixture conduit, and openings for the entry and escape of exhaust gases in the shell, and an air tube extending longitudinally through said shell and having openings for communication with the outside air and with the interior of the conduit beyond the shell end.

11. A fuel modifier for a gas engine having a mixture conduit and an exhaust conduit comprising a shell having a threaded portion for engagement with a threaded side-opening in to the mixture conduit, means for conducting exhaust gases from the exhaust conduit to said shell and an auxiliary air supply passage carried by said shell to be heated by the exhaust gases, said air passage having communication with the outside air and with the interior of the mixture conduit.

12. A mixture modifier for a gas engine having a mixture conduit and an exhaust conduit, comprising a shell having a chambered portion projecting into the mixture conduit, said shell having an exhaust-receptive connection with the exhaust conduit and an outlet opening, a baffle within said chamber for directing the gases into the projecting part of the shell, and an air tube associated with the shell and opening at opposite ends to the mixture conduit and outside of the modifier.

In testimony whereof I hereunto set my hand in the presence of two subscribing witnesses.

EDWARD J. WIGGINS.

In the presence of—
 STANLEY W. COOK,
 MARY Y. ALLEN.